(12) United States Patent
Van Raalte et al.

(10) Patent No.: US 8,615,844 B2
(45) Date of Patent: Dec. 31, 2013

(54) DUST FILTER AND VACUUM CLEANER COMPRISING SUCH A FILTER

(75) Inventors: Margarita Zwanette Van Raalte, Hoogeveen (NL); Thelma Fernandina Geusebroek-Oskam, Woerden (NL); Paulus Hermanus Van Wolferen, Hoogeveen (NL); Akko Wolters, Hoogeveen (NL)

(73) Assignee: Koninklijke Philips N.V., Eindhoven (NL)

( * ) Notice: Subject to any disclaimer, the term of this patent is extended or adjusted under 35 U.S.C. 154(b) by 1015 days.

(21) Appl. No.: 12/302,322

(22) PCT Filed: May 31, 2007

(86) PCT No.: PCT/IB2007/052040
§ 371 (c)(1),
(2), (4) Date: Nov. 25, 2008

(87) PCT Pub. No.: WO2007/141712
PCT Pub. Date: Dec. 13, 2007

(65) Prior Publication Data
US 2009/0183338 A1    Jul. 23, 2009

(30) Foreign Application Priority Data
Jun. 2, 2006    (EP) ..................................... 06114928

(51) Int. Cl.
*A47L 9/20*    (2006.01)
(52) U.S. Cl.
USPC .................. 15/352; 55/299; 55/300; 55/304; 95/282

(58) Field of Classification Search
USPC ........... 15/89, 90, 91, 92, 352, 370, 382, 394; 55/290, 295, 296, 297, 299, 300, 304
IPC ........................................................ A47L 9/20
See application file for complete search history.

(56) References Cited

U.S. PATENT DOCUMENTS

| | | | | |
|---|---|---|---|---|
| 3,591,888 A | * | 7/1971 | Takeda et al. | 15/323 |
| 3,841,067 A | * | 10/1974 | Kato et al. | 55/300 |
| 3,856,488 A | * | 12/1974 | Kato et al. | 55/300 |
| 4,209,873 A | * | 7/1980 | Schaefer | 15/182 |
| 4,234,413 A | * | 11/1980 | Summers | 209/17 |
| 4,443,235 A | * | 4/1984 | Brenholt et al. | 96/408 |

(Continued)

FOREIGN PATENT DOCUMENTS

| | | |
|---|---|---|
| GB | 2280388 A | 2/1995 |
| JP | 52030064 A | 3/1977 |

(Continued)

*Primary Examiner* — Joseph J Hail
*Assistant Examiner* — Joel Crandall

(57) ABSTRACT

A dust filter for filtering dust out of an air stream has a filter membrane pleated into a row of pleats. A pleat deflector is movably suspended for moving along the row of pleats for cleaning the filter membrane. The deflector has a free end extending between the pleats when the deflector and the pleats are in undeflected condition, such that when the deflector is moved along the row of pleats, the pleats are deflected and released in succession along the row. The deflector includes a flexible plate of which at least a portion between the suspension and the free end has a width transverse to the direction of movement of the deflector, where the width decreases with the distance to the suspension.

14 Claims, 5 Drawing Sheets

(56) References Cited

U.S. PATENT DOCUMENTS

| | | | |
|---|---|---|---|
| 4,565,555 A | * | 1/1986 | Menasian ......................... 55/288 |
| 5,584,656 A | * | 12/1996 | Rose ........................... 416/132 A |
| 5,584,900 A | * | 12/1996 | Zaiser et al. .................... 55/293 |
| 5,605,233 A | * | 2/1997 | Hauch ............................ 209/385 |
| 6,758,874 B1 | * | 7/2004 | Hunter, Jr. ...................... 55/337 |
| 6,797,046 B2 | * | 9/2004 | Wang ............................. 96/421 |
| 7,318,249 B2 | * | 1/2008 | Lin .................................. 15/352 |
| 2002/0166199 A1 | * | 11/2002 | Boles et al. ..................... 15/352 |
| 2005/0081321 A1 | * | 4/2005 | Milligan et al. ................ 15/344 |
| 2005/0183233 A1 | | 8/2005 | Lin |
| 2005/0198766 A1 | * | 9/2005 | Nam et al. ...................... 15/352 |

FOREIGN PATENT DOCUMENTS

| | | | |
|---|---|---|---|
| JP | 55088821 A | * | 7/1980 |
| JP | 57144016 A | * | 9/1982 |
| JP | 2004358031 A | * | 12/2004 |
| KR | 2002091423 A | * | 12/2002 |

* cited by examiner

DUST FILTER AND VACUUM CLEANER COMPRISING SUCH A FILTER

The invention relates to a dust filter for filtering dust out of an air stream in a vacuum cleaner and to a vacuum cleaner equipped with such a filter. In time, such filters, which may also be used as a secondary filter downstream of a dust bag or a dust separating cyclone, become clogged-up by dust particles forming a dust cake sticking to the filter membrane, the resistance that air encounters when flowing through the filter increases which is detrimental to the suction power of the vacuum cleaner. Regularly cleaning the filter is helpful for avoiding decay of suction power without having to replace the filter with a fresh one each time the filter has become so clogged-up that the effective suction power has become too low.

According to U.S. Patent Application Publication 2005/0183233 a number of sweeping members is provided that have free ends that can be moved along pleats of the filter member to sweep or stir dust off the filter member.

Although this manner of cleaning the filter is practical because the filter can stay in the vacuum cleaner and dust that has been removed stays inside the vacuum cleaner, improvement of the overall affectivity of the cleaning process, in particular with respect to the removal of fine dust, is desired.

It is an object of the invention to provide a durable solution that allows the dust and in particular fine dust to be removed from the filter member effectively.

Because at least a portion of the flexible plate between the suspension and the free end of the deflector has a width transverse to the direction of movability of the deflector, which decreases with the distance to the suspension, the flexible plate is stiffer in areas thereof where bending loads in use are relatively high than it is in areas where bending loads in use are relatively low. This causes the flexible plate to have a higher overall stiffness without undue reduction of the durability. The increased overall stiffness is advantageous for exerting relatively high forces onto the pleats and hitting the pleats relatively hard, so that in operation, the pleats of the filter membrane are knocked and shaken vigorously and dust is shaken off the filter membrane effectively. Because of the increased stiffness of the flexible plate, it returns towards its unloaded shape relatively quickly after being released. The fast movement of the deflector towards its original shape, makes it possible to deflect successive pleats at a high rate. Moreover, the energetic return of the deflector towards its unloaded position also causes the deflector to strike the next pleat with a high energy impact, so that dust is effectively knocked off that next pleat.

The increased stiffness of the flexible plate furthermore allows to deflect pleats having a higher stiffness. An increased stiffness of the pleats results in a relatively quick spring back motion of the pleats after being released by the deflector. The return of the pleats towards their original shape and position with high rates of acceleration and deceleration after being bent and released by the deflector, causes accumulated dust to be shaken off the pleats more effectively.

Further aspects, effects and details of the invention are set forth in the detailed description with reference to examples of which some are shown in the schematic drawings.

Figure 1:
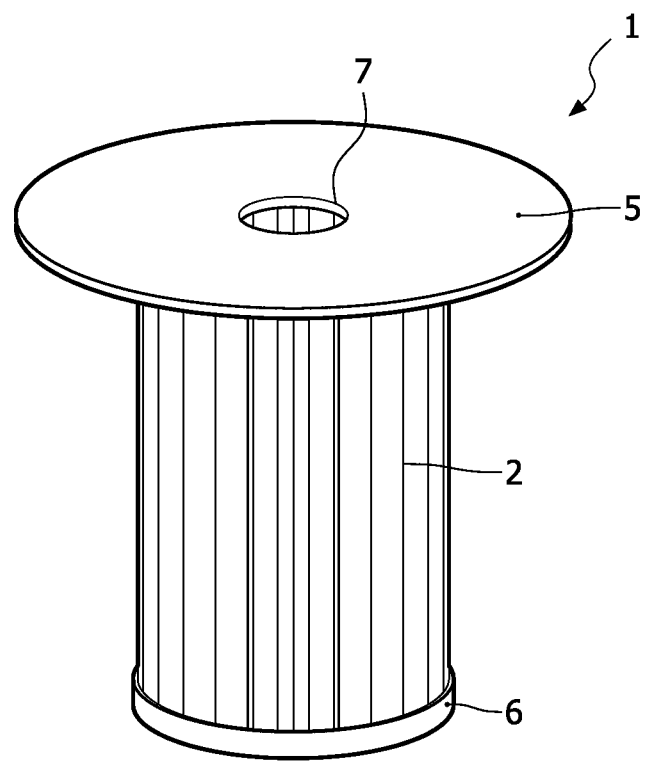
FIG. 1 is a perspective view of an example of a filter according to the invention.
Figure 2:
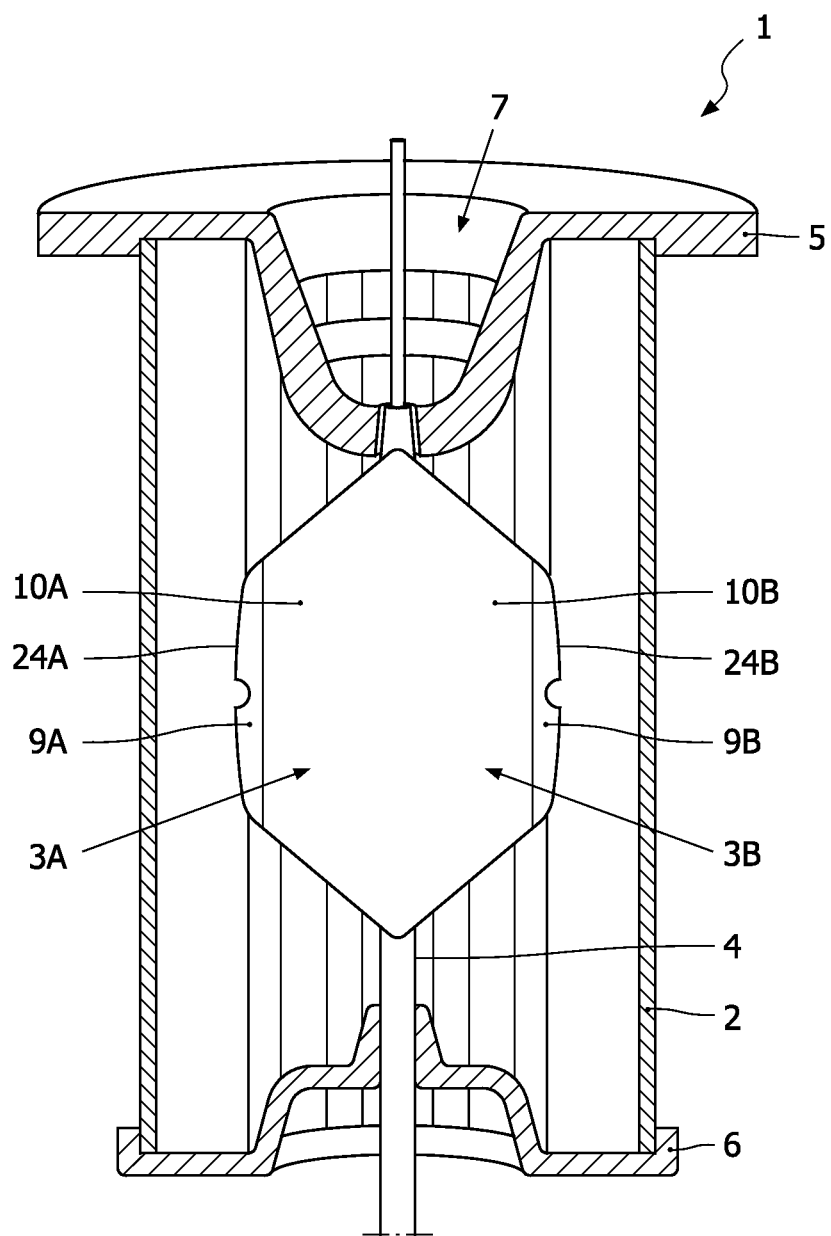
FIG. 2 is a frontal view in section of the filter shown in FIG. 1.

The example of a filter 1 according to the invention shown in FIGS. 1-3 and 6 has a top end member 5 and a bottom end member 6, in-between which a pleated filter membrane 2 is fixed. The top end member 5 of the filter 1 is provided with an air passage 7. A shaft 4 is rotatably suspended from the end members 5, 6. The shaft 4 carries two deflectors 3A, 3B. The filter 1 is a generally cylindrical filter cartridge of which the filter membrane 2 is permanently attached between the end members 5, 6.

The filter membrane 2 is formed out of one or more layers of sheet material by pleating the material to form a row of pleats 8. The filter membrane 2 may be formed of any suitable commercially available filter material. Filter layer materials from which dust can be shaken off easily, such as ePTFE, are particularly suitable. Preferably, the filter membrane also has a backing layer for support, which has no substantial filtering function.

The filter membrane 2 of the filter 1 according to the present example is formed into a pleated circumferential cylinder wall and has a first and a second end joined to each other so that the wall is endless. The filter membrane 2 is placed between the top end member 5 and the bottom end member 6, the pleats 8 running in a direction from top end member 5 to bottom end member 6, thereby providing not only an enlarged filtering surface, but also additional strength to the filter membrane 2.

The shaft 4 is bearing-mounted in both the top end member 5 and the bottom end member 6, and extends beyond the bottom end member 6 to allow coupling of the shaft to a drive for driving rotation of the shaft 4. The shaft 4 is suspended in a position coaxial with the generally cylindrical filter membrane 2.

The deflectors 3A, 3B each extend from the shaft 4 to the pleats 8 and each have a free end 9A, 9B projecting between the pleats 8, at least when the pleats 8 and the deflectors 3A, 3B are in undeflected condition. When the deflectors and the pleats are in undeflected condition, the free ends 9A, 9B preferably project between the filter pleats 8 to a depth of 5 to 25%, and more preferably to a depth of 10 to 20%, of the pleat depth measured from a plane defined by free ends of neighboring pleat walls on opposite sides of an interspace between two successive pleat walls to a dead end of the interspace between the two successive pleat walls, the angle between the legs of each pleat preferably being smaller than 25°. The deflectors 3A, 3B each include a flexible plate 10A, 10B extending from the shaft 4 towards the pleats 8.

For cleaning of the filter membrane 2 the free ends 9A, 9B of the deflectors 3A, 3B are moved along the row of pleats 8 by rotating the shaft 4. Because the undeflected free ends 9A, 9B of the deflectors 3A, 3B extend in-between the undeflected pleats 8, the pleats 8 are deflected and released in succession along the row as the deflectors 3A, 3B are moved along the pleats 8.

Figure 5:
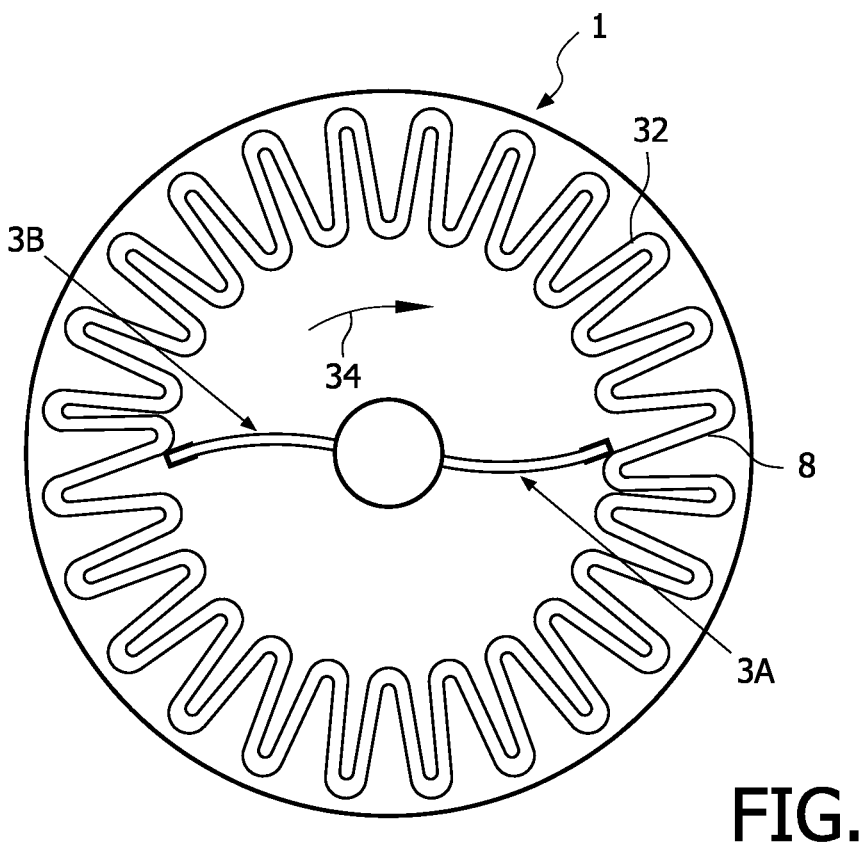
FIG. 5 is a top view in section of the filter shown in FIGS. 1-3 with deflectors and two pleats in deflected condition.

When a deflector 3A, 3B is moved against a pleat 8, its free end 9 exerts a force to the side of the pleat 8 causing both the pleat 8 to be bent as the deflector shaft 4 rotates further. At the same time, the flexible plate 10A, 10B are bent to a deflected condition. FIG. 5 shows the flexible plates 10A, 10B in a deflected condition. At a certain moment the deflector 3A, 3B becomes disengaged from the pleat 8 and the pleat 8 is released and springs back towards its undeflected condition.

At the same time, the deflector 3A springs back towards its undeflected condition as a leaf spring, and will hit the next pleat 8, preferably before being fully undeflected. Depending on the configuration of the pleats 8 and the deflector 3A, the deflector 3A may only bend one pleat 8 at the time or two or more successive pleats 8 together, only releasing a pleat 8 after another pleat 8 is (partially) bent. The number of pleats 8 that are simultaneously bent by the deflector 3A may vary somewhat as the deflector moves along the row of pleats. Although the pleats 8 are preferably released individually after having been deflected, it may also occur that successive pleats 8 are released simultaneously.

The flexible plates 10A, 10B each have a width transverse to the direction of movability of the deflectors 3A, 3B that decreases with the distance to the shaft 4 which forms the suspension from which the deflectors 3A, 3B are suspended. Because of this width increasing towards the suspension, the flexible plates 10A, 10B are stiffer close to the suspension, where the bending loads in use are relatively large, than more remote from the suspension, where the bending loads are relatively low. Thus, the stiffness of the deflectors against displacement of the deflector tip is higher than that of comparable deflectors, for example deflectors having the same thickness and average width, while durability is improved because bending deformations are more equally distributed over the deflector. In particular, maximum deformation in the heavily loaded portions close to the suspension are reduced.

The relatively high stiffness moreover allows the deflector to sufficiently deflect relatively stiff pleats 8, which shake off dust more effectively than soft pleats, because stiff pleats spring back more quickly. To obtain stiff pleats, for a 4-10 cm inner diameter filter, the filter membrane preferably has a backing of at least 150 g/m2 and preferably of 200 g/m2-300 g/m2. The stiffnesses of the pleats 8 and of the deflectors are preferably such that deformation of the deflector in a direction perpendicular to the row of pleats, from unloaded condition to a deformed condition at the moment of release of a pleat is at most equal to the deformation of each of the pleats 8 in a direction perpendicular to the row of pleats, from unloaded condition to a deformed condition at the moment of release of that pleat 8.

It is noted that, although the width of the flexible plates preferably decreases gradually and, more preferably, in proportion with the bending moment exerted thereon when the free ends engage the pleats, it is also possible to provide that the width decreases with the distance to the suspension over only a portion of radial length of the flexible plate and/or that the width decreases stepwise.

Another advantage of the deflector 3A, 3B having a high stiffness, is that the deflector 3A, 3B recovers to its original shape fast after bending a filter pleat 8. This is necessary for bending the next pleat 8. The energetic return to its stretched position may also cause the deflector 3A, 3B to strike the next pleat 8 with a strong impact, which loosens up dust clinging to the filter membrane 2.

The free ends 9A, 9B of the deflectors 3A, 3B have a curved contour and more in particular, the radius of curvature of that contour is larger in a central portion of the free ends 9A, 9B than at side portions of the free ends. When bent by the deflector 3A, 3B, the portions of the pleats 8 along the path of a central portion of the deflector edges 24A, 24B tend to be deflected further than portions along the paths of the portions of the deflector edges 24A, 24B more to the side of the deflector edges 24A, 24B. The curved contours of the deflector edges 24A, 24B cause the contact pressure between the deflectors 3A, 3B and the pleats 8 to be more evenly distributed, thereby minimizing localized peak loads and accordingly local wear of the pleats 8. Accordingly, the filter membrane can be cleaned more often before wear causes the filter to leak.

Moreover, the free ends 9A, 9B of the deflectors 3A, 3B are covered with a plastic material 14. The plastic material 14 is softer and smoother than a metal edge and therefore causes less wear of the filter membrane 2. For efficient injection moulding of the deflector tips, it is advantageous to provide recesses as shown in the deflector edges 24A, 24B. In the recess, the sprue left by the injection gate may be located without causing damage to the filter membrane.

Figure 6:
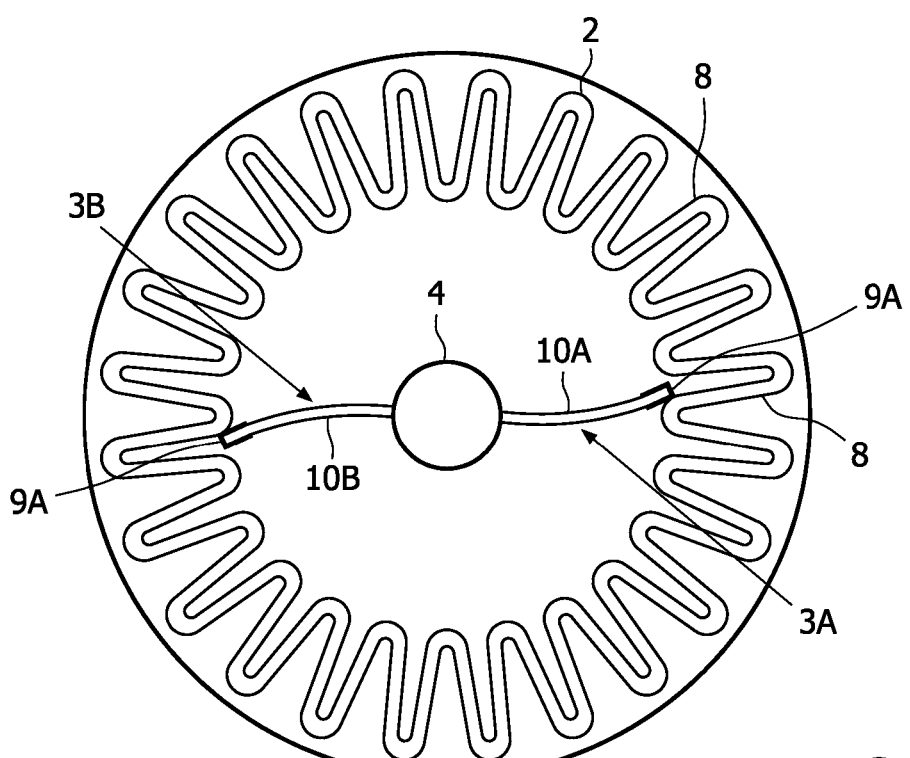
FIG. 6 is a view according to FIG. 5, with deflectors and pleats in undeflected condition.

As is best seen in FIG. 6, the free ends 9A, 9B of the deflector 3A, 3B are at least partially pre-bent backward relative to said direction or sense of movability 34. This is advantageous, because it allows the deflector tips to be bent radially inward with relatively little specific deformation of the flexible plate 10A, 10B.

In the present example, the deflectors 3A, 3B are suspended and dimensioned such that, when the deflector 3A, 3B is moved along the row of pleats 8 starting from a substantially flat configuration in unloaded condition (i.e. before being pre-bent in unloaded condition), the flexible plate 10A, 1OB is plastically deformed into an at least partially pre-bent shape as described above. Because the extent to which the deflectors 3A, 3B are pre-bent thus depends on the locations of and the stiffnesses of the pleats 8 of the filter membrane 2, the shape to which the deflectors 3A, 3B are pre-bent is adjusted accurately to the characteristics of the particular filter membrane 2 with which the deflectors 3A, 3B are to co-operate when in use. In a filter according to the present example, this feature is of particular advantage, because the end members 5, 6 are permanently bonded to the filter membrane 2 and the deflectors 3A, 3B are mounted in-between and are therefore, at least practically considered, inseparatable from the filter membrane 2 of the same filter cartridge. When a new filter cartridge according to this example is provided to replace an old one, it comes with a new deflector inseparatably pre-mounted in the filter cartridge. In new condition, the distance over which the deflectors project between the pleats, when not exerting a force on the pleats, is preferably at least 1.5 mm. After use, this distance may become smaller than 1.5 mm due to the permanent deformation of the deflectors and the pleats.

The flexible plates 10A, 10B of the deflectors 3A, 3B of the filter 1 according to the present example are parts of a single common plate mounted to the shaft 4 and extending on opposite sides of the shaft 4.

For low-cost manufacturing, it is advantageous if the flexible plates 10A, 10B are made out of flat sheet material with a substantially constant thickness, for example spring steel.

Preferably, for a filter having an inner diameter of 5 cm, the flexible plates are of spring steel having a constant thickness between 0.15 mm and 0.25 mm. The filter preferably has an inner diameter of 4-10 cm. If the filter has an inner diameter smaller or larger than 5 cm, the thickness of the spring is preferably selected proportionally smaller or, respectively larger, than the thickness range preferred for a 5 cm diameter filter, to keep maximum stress in the flexible plate at the same level, assuming that the maximum deflections at the deflector tip will be approximately proportional with the filter diameter and the accordingly increased pleat size.

Figure 3:
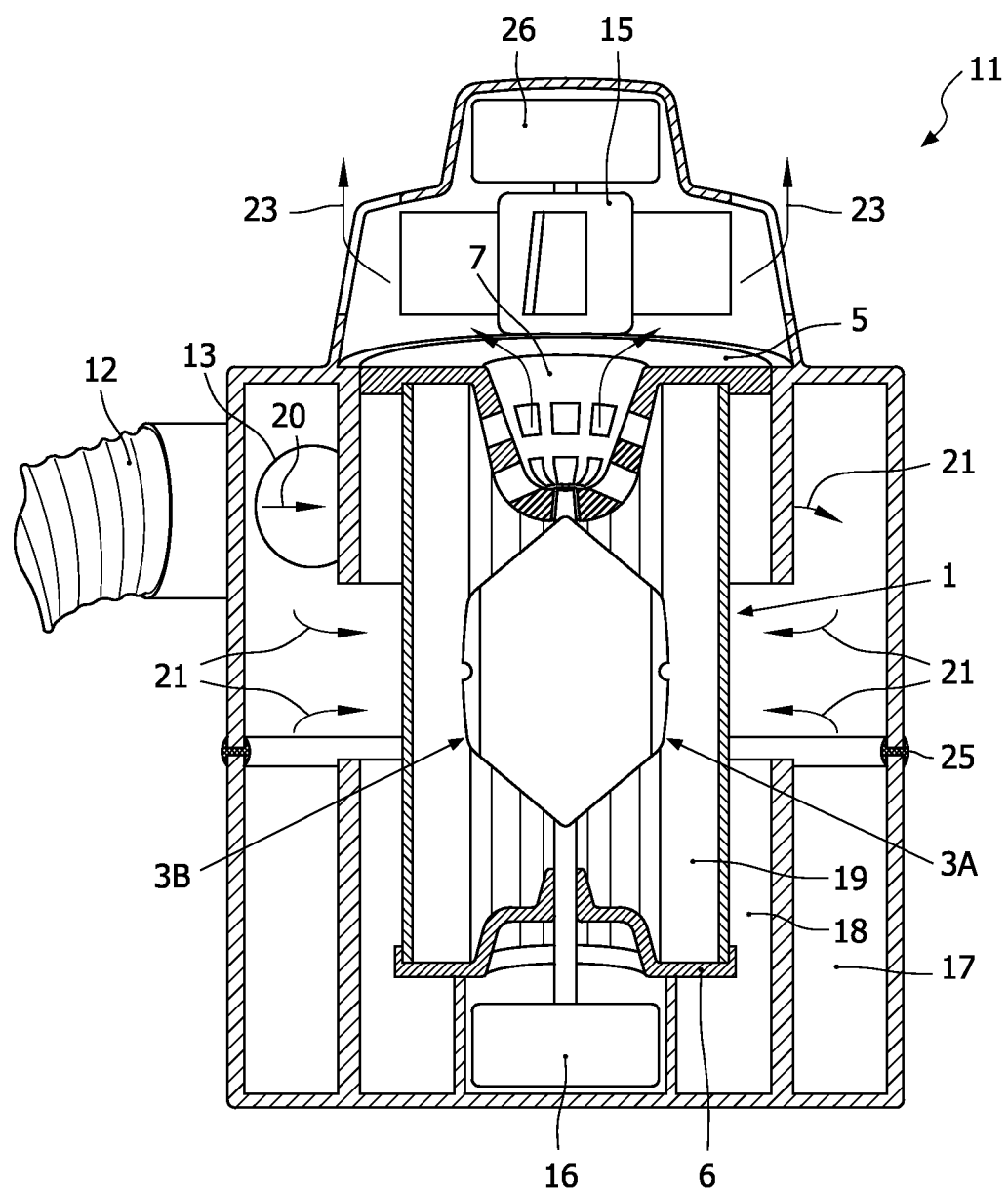
FIG. 3 is a sectional view of a vacuum cleaner equipped with a filter as shown in FIGS. 1 and 2.

FIG. 3 shows an example of how a filter 1 according to the present invention may be incorporated in a vacuum cleaner 11 to form a vacuum cleaner according to the invention. The vacuum cleaner 11 has an outer chamber 17, an intermediate chamber 18, and an outflow chamber 19. The filter 1 is placed centrally in the intermediate chamber 18 with the air passage 7 opening out in an upward direction and separates the outflow chamber 19 bounded by the filter membrane 2 from the intermediate chamber 18. A fan 15 coupled to a motor 26 is mounted downstream of the air passage 7. In the lower part of the vacuum cleaner a motor 16 is located coupled to the shaft 4 for driving rotation of the deflectors 3A, 3B along the pleats 8 of the filter 1. A hose 12 is connected to the housing of the vacuum cleaner 11 and opens out into the outer chamber 17.

In operation, the fan 15 draws air through the system via the hose 12 and tangential inlet 13, as is indicated by arrow 20. The air stream continues through the outer and middle ring 17, 18, as indicated by arrows 21, and through the pleated filter membrane 2 into the chamber 19. The filtered air is then aspired out of the filter 1 via the outlet 7 and blown out of the vacuum body via ventilation slots, respectively as indicated by arrows 23.

The tangential inlet 13 causes air and dust to circulate in the outer ring-shaped chamber 17. This creates a centrifugal effect strong enough to separate especially larger dust particles from the air flow to the intermediate chamber 18. The larger particles will finally settle down on the bottom of the outer ring 17.

Thus the air entering the intermediate ring-shaped chamber 18 still contains fine dust particles, which are filtered out, at least to a very large extent, when the air passes through the filter membrane 2 into the central chamber 19.

In time, dust particles stuck to the filter membrane 2 form a dust cake on its surface and the resistance caused by the filter increases accordingly, causing the vacuum cleaner 11 to generate less suction power at the inlet end of the hose 12. The dust cake can to a large extent be removed by moving the deflectors 3A, 3B along the pleats 8 as described above, preferably while the fan 15 is not driving an air stream through the filter 2. The agitation of the pleats 8 causes the dust cake to be cracked and shaken off the filter membrane 2 and to drop to a bottom portion of the intermediate chamber underneath the filter 1. The particles of dust collected in the bottom portion of the outer and middle chambers 17, 18 can be removed by opening the vacuum cleaner along the seam 25 and discharging the accumulated dust.

In the present example, the air entraining dust is guided through the filter membrane 2 from the outside of the filter 1 to the inside of the filter 1. In this way the dust filtered out of the air stream accumulates on the outside of the filter 1. Therefore, the deflectors 3A, 3B are shielded from most of the dust and operation of the deflectors cannot not be hampered by large amounts of dust and items like hairs accumulating around the deflectors.

Preferably, the motor 16 is adapted for driving rotation of the deflectors 3A, 3B along the row of pleats 8 with a circumferential velocity at the free ends 9A, 9B of the deflectors of at least 0.3 m/s, and preferably at least 0.5 m/s At regular intervals, for example depending on the level of pressure drop over the filter 1 or on elapsed time after a previous cleaning during which the vacuum cleaner has been used, the motor 16 can be activated for rotating the shaft 4 and driving the deflectors 3A, 3B along the pleats 8 while the fan 15 is not driving an air stream through the filter 2. During the cleaning process the motion of the deflectors 3A, 3B may occur at varying speeds and be interrupted. The sense of rotation may be inverted, but is preferably always the same.

Figure 4:
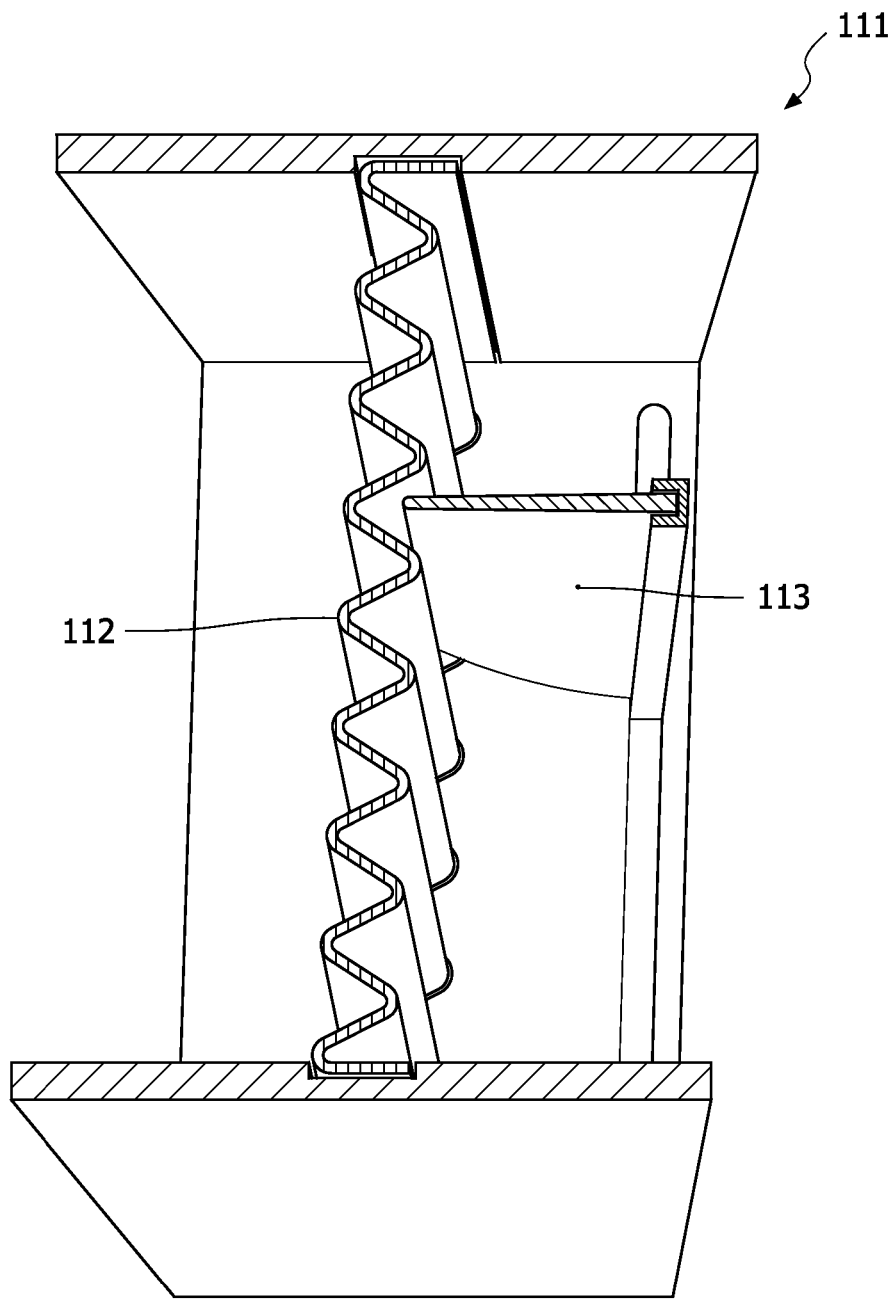
FIG. 4 is a perspective view of another example of a filter according to the invention.

From the foregoing, it will be clear to the skilled person, that within the framework of invention as set forth in the claims also many variations other than the examples described above are conceivable. For instance, the deflector could also be situated at the outside of the filter. Also it is possible to pass the air from the inside of the filter to the outside of the filter with the deflector again on the outside. Instead of two deflectors, a single deflector or a larger number of deflectors may be provided. The flexible plate could also be made of another type of material, such as a composite material containing fibres and a matrix material. Further the filter could be rotated while the deflector remains stationary, or both the filter and the deflector could be rotated in relative opposite directions. In FIG. 4, an alternative embodiment is shown in which the filter 111 is a panel filter. The deflector 113 is slightly thinner at its free end than at its connected end and is suspended for movement up and down along the pleats 112 for loosening dust.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

A dust filter for filtering dust out of an air stream has a filter membrane pleated into a row of pleats. A pleat deflector is movably suspended for movability along the row of pleats, for cleaning the filter membrane. The deflector has a free end extending between the pleats when the deflector and the pleats are in undeflected condition, such that when the deflector is moved along the row of pleats, the pleats are deflected and released in succession along the row. The deflector is or comprises a flexible plate of which at least a portion between the suspension and the free end has a width transverse to the direction of movability of the deflector, which decreases with the distance to the suspension. Thereby, a deflector of increased stiffness is obtained which is advantageous for effective dust removal.

The invention claimed is:

1. A dust filter for filtering dust out of an air stream in a vacuum cleaner including a motor, the filter comprising:
    a top end having an air passage and a bottom end positioned above the motor;
    a filter membrane pleated into a row of pleats and fixedly attached between the top end and the bottom end; and
    a shaft rotatably attached to the top end and fixedly attached to the motor; and
    a flexible plate attached to the shaft and having
        a width parallel the shaft, the width decreasing gradually over at least a portion of the flexible plate from the shaft to the pleats, and
        a free end configured to extend between the pleats for movement along the row of pleats to deflect and release the pleats in succession for cleaning the filter membrane
    as the flexible plate rotates around the shaft.

2. A filter according to claim 1, wherein the flexible plate comprises a flat sheet material with a substantially constant thickness.

3. The filter according to claim 1, wherein the filter membrane comprises a first end and a second end joined together and extends around an outflow space.

4. A filter according to claim 3, wherein the filter membrane comprises a circumferential cylinder wall coaxial with the shaft.

5. The filter according to claim 4, further comprising at least two flexible plates projecting from opposite sides of said shaft.

6. The filter according to claim 1, wherein the free end is movable along the pleats in a direction of movement, and the flexible plate is at least partially pre-bent backward relative to said direction of movement.

7. The filter according to claim 1, when the free end is moved along the row of pleats starting from a substantially flat configuration in unloaded condition, the flexible plate is plastically deformed into a shape at least partially bent backward relative to a direction of the movement.

8. A filter according to claim 1, wherein the free end has an at least partially curved contour.

9. The filter of claim 1, wherein the free end projects between the pleats to a depth of the pleat selected from one of 5 to 25% and 10 to 20%.

10. The filter of claim 1, wherein the width of the flexible plate at the shaft is substantially equal to a distance between the top end and the bottom end.

11. A dust filter for filtering dust out of an air stream in a vacuum cleaner including a motor, the filter comprising:
 a filter membrane pleated into a row of pleats;
 a shaft rotatably attached to the top end and fixedly attached to the motor; and
 a flexible plate attached to the shaft and having
  a width parallel the shaft, the width decreasing gradually over at least a portion of the flexible plate with an increasing distance from the shaft to the pleats, and
  a free end configured to extend between the pleats for movement along the row of pleats to deflect and release the pleats in succession for cleaning the filter membrane,
 wherein the free end has an at least partially curved contour parallel the shaft, and
 wherein a radius of curvature of said contour is larger in a central portion of said free end than at side portions of said free end.

12. A vacuum cleaner having a filter, the filter comprising:
 a top end having an air passage and a bottom end;
 a filter membrane pleated into a row Of pleats and fixedly attached between the top end and the bottom end;
 a shaft rotatably attached to the top end and the bottom end; and
 a flexible plate attached to the shaft and having
  a width parallel the shaft, the width decreasing gradually over at least a portion of the flexible plate from the shaft to pleats, and
  a free end configured to extend between the pleats for movement along the row of pleats to deflect and release the pleats in succession for cleaning the filter membrane as the flexible plate rotates around the shaft.

13. The vacuum cleaner according to claim 12, further comprising a drive for driving the free end along the row of pleats with a speed relative to a tip of the pleat of at least 0.3 m/s.

14. The vacuum cleaner according to claim 12, further comprising a drive for driving the free end along the row of pleats with a speed relative to a tip of the pleat of at least 0.5 m/s.

* * * * *